US008511866B1

(12) United States Patent
Mendez

(10) Patent No.: US 8,511,866 B1
(45) Date of Patent: Aug. 20, 2013

(54) BACKUP LIGHTING SYSTEM

(76) Inventor: Moises Mendez, Irvine, CA (US)

(*) Notice: Subject to any disclaimer, the term of this patent is extended or adjusted under 35 U.S.C. 154(b) by 286 days.

(21) Appl. No.: 12/964,476

(22) Filed: Dec. 9, 2010

(51) Int. Cl.
*B60Q 3/04* (2006.01)

(52) U.S. Cl.
USPC ........... 362/362; 362/368; 362/365; 362/374; 362/375

(58) Field of Classification Search
USPC .......................................... 362/362, 364–375
See application file for complete search history.

(56) References Cited

U.S. PATENT DOCUMENTS

| | | | |
|---|---|---|---|
| 3,971,028 | A | 7/1976 | Funk |
| 4,617,613 | A | 10/1986 | Rice |
| 5,288,945 | A | 2/1994 | Bruce |
| 5,813,873 | A | 9/1998 | McBain et al. |
| D464,865 | S | 10/2002 | Luu |
| 6,547,411 | B1 | 4/2003 | Dornbusch |
| 6,666,712 | B1 | 12/2003 | Kramer |
| 7,036,948 | B1 | 5/2006 | Wyatt |
| 2006/0267788 | A1 | 11/2006 | Delany |
| 2008/0233780 | A1 | 9/2008 | Waters et al. |

*Primary Examiner* — Tuyet Thi Vo

(57) ABSTRACT

A backup lighting system for providing lighting when power is out featuring a base divided into a front half and a back half, which can be separated. A dimmer is disposed on a front surface of the base. Wiring is disposed on the base. The wiring is adapted to engage electrical circuitry. A base cover is removably attached to the front surface of the base. A display is disposed in a center of the base cover. The dimmer is operatively connected to the display and the dimmer provides light to the display. Dimmer icons are disposed on the display and function to brighten or dim the dimmer. A battery is disposed in the front half of the base. The battery is operatively connected to the dimmer, the wiring, and the display. The dimmer provides light via the battery whether or not power is provided via the wiring.

12 Claims, 4 Drawing Sheets

BACKUP LIGHTING SYSTEM

FIELD OF THE INVENTION

The present invention is directed to a backup light, more particularly to a backup light system that provides high quality light.

BACKGROUND OF THE INVENTION

When power is lost or interrupted, luminosity must be sacrificed in order to have functional backup lighting. Nightlights can be used, but that causes loss of an electrical outlet. Some individuals have to guess where light switches are in the dark. Some individuals have no backup lighting. The present invention features a backup lighting system, which provides good quality lighting if power is lost or interrupted. The system of the present invention can group power sources for maximum versatility and functionality (e.g., 120v power outlet and SV USB output). The system saves power if it's not in use (e.g., photocell auto-off, timers). The system applies to commercial and non-commercial environments and promotes safety. The system has a self-sustaining power source, embedded child safety features, is environmentally friendly, and is expandable to light switch and power strips. The system features a USB charging output within an electrical outlet or power strip.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a backup lighting system, which provides good quality lighting if power is lost or interrupted. In some embodiments, the backup lighting system comprises a base divided into a front half and a back half, the front half and back half can be separated; a dimmer disposed on a front surface of the base, the dimmer comprises a light system for illuminating the dimmer; a first bracket and a second bracket both disposed on the base, the brackets allow the base to be mounted in a socket; wiring disposed on the base, the wiring is adapted to engage electrical circuitry; a base cover removably attached to the front surface of the base, a display is disposed in a center of the base cover, wherein when the base cover is attached to the base the display covers the dimmer, the dimmer is operatively connected to the display, and the dimmer provides light to the display, wherein dimmer icons are disposed on the display and function to brighten or dim the dimmer; and a battery disposed in the front half of the base, the battery is operatively connected to the dimmer, the wiring, and the display, wherein the dimmer provides light via the battery whether or not power is provided via the wiring.

In some embodiments, the first bracket is disposed on a top of the base near the front surface. In some embodiments, the second bracket is disposed on a bottom of the base near the front surface. In some embodiments, the backup lighting system further comprises a locking mechanism for securing the front half of the base to the back half of the base. In some embodiments, the locking mechanism features a release button, which can be pressed to detach the front half of the base from the back half of the base.

In some embodiments, the display is a touch screen display. In some embodiments, the display comprises a power icon. In some embodiments, the display comprises a clock icon. In some embodiments, the display comprises a date icon. In some embodiments, the display comprises a light emitting diode.

In some embodiments, the backup lighting system further comprises a battery cover disposed on an inner surface of the front half of the base that can open and close respectively allowing and preventing access to the battery. In some embodiments, the battery cover comprises a battery cover release button that functions to open the battery cover.

DESCRIPTION OF PREFERRED EMBODIMENTS

Figure 1:
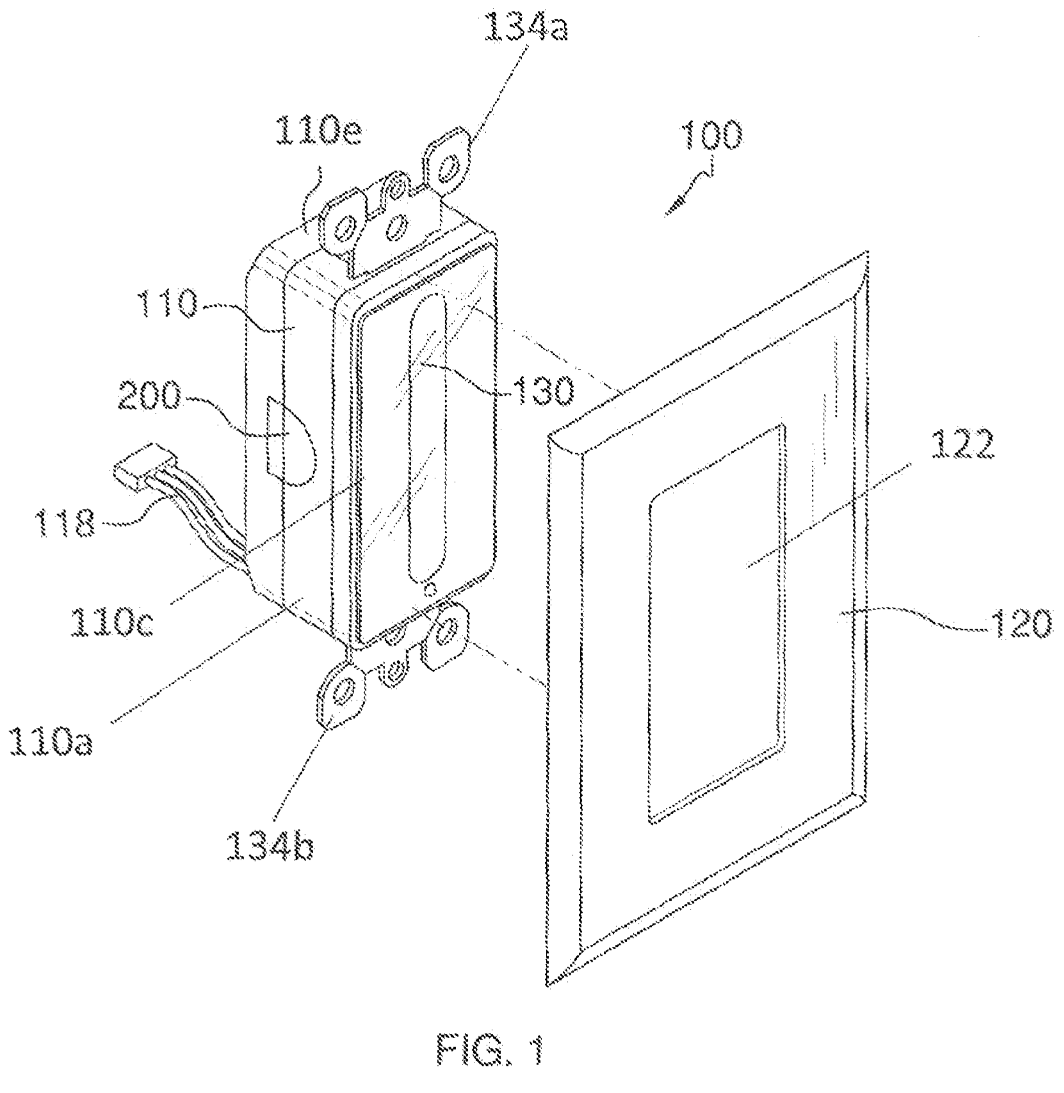
FIG. 1 is a perspective view of the backup lighting system of the present invention.

The following is a listing of numbers corresponding to a particular element refer to herein:

100 backup lighting system
101 front half of base
102 back half of base
110 base
118 wiring/harness
120 base cover
122 display
130 dimmer (e.g., glowing area, etc.)
134*a* first bracket
134*b* second bracket
140 power icon (etched)
160 clock icon
162 date icon
200 locking mechanism (latch)
201 release button
240 light emitting diodes (LEDs)
300 battery cover
310 battery cover release button
320 male harness connectors Referring now to FIG. 1-5, the present invention features a backup lighting system 100, which provides good quality lighting if power is lost or interrupted. The system 100 comprises a base 110 having a front surface 110*c*, a first side 110*a*, a second side, a top 110*e*, a bottom, a back, and an inner cavity. In some embodiments, the base 110 can be mounted into a socket of some sort (e.g., in a wall, etc.), for example an electrical socket. In some embodiments, 110 the base 110 can engage electrical wiring, e.g., wiring 118 (e.g., harness) is disposed on the base 110, which can engage other electrical wiring.

Disposed on the top 110*e* of the base 110 (e.g., near the front surface) is a first bracket 134*a*. A second bracket 134*b* is disposed on the base 110 on the bottom (near the front surface). The brackets 134 function to allow the base 110 to be attached or secured in an electrical socket or other location. The brackets 134 may resemble standard brackets for electrical outlets, which are well known to one of ordinary skill in the art.

Figure 4A:
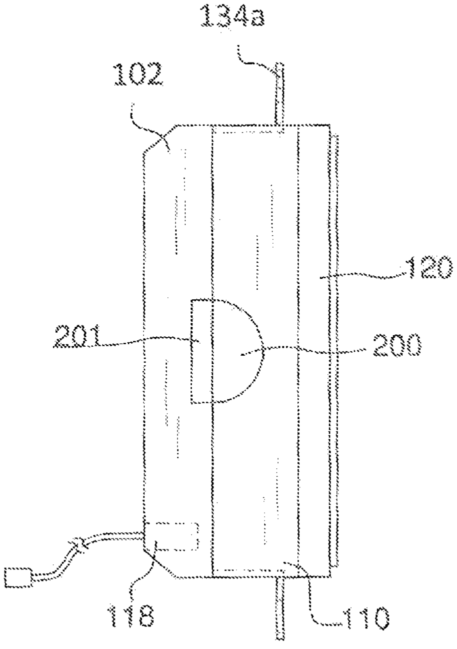
FIG. 4A is a first side view of the backup lighting system of the present invention.
Figure 4B:
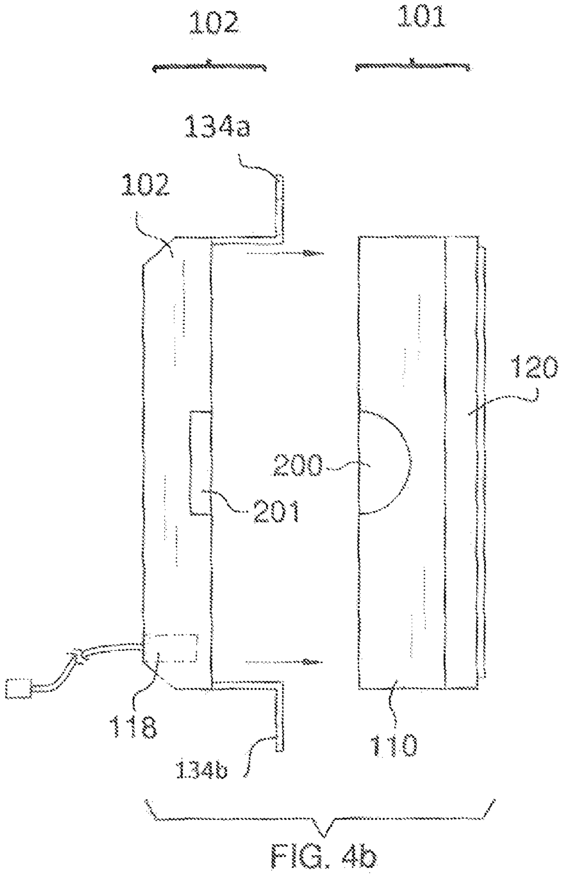
FIG. 4B is a second side view of the backup lighting system of the present invention.

The base 110 can be moved between an open position and a closed position respectively allowing and preventing access to the inner cavity of the base 110. For example, in some embodiments, the base 110 is divided into a front half 101 and a back half 102, which can be separated (e.g., see FIG. 4B) so allow access to the inner cavity of the base 110. As shown in FIG. 4A and FIG. 4B, the base 110 comprises a locking mechanism 200 (e.g., a latch) for securing the base 110 in the closed position. The locking mechanism 200 features a release button 201, which can be pressed to move the base to the open position. Such locking mechanisms and release buttons are well known to one of ordinary skill in the art. The back half 102 of the base 110 may comprise electrical circuitry, which is operatively connected to the wiring 118.

In some embodiments, a male harness connector 320 is disposed on the inner surface 101*a* of the front half 101 of the base 110. In some embodiments, the male harness connector 320 engages a female harness connector (e.g., on the back half 102 of the base 110). The female harness connector may contain pressure clips to connect to wiring (e.g., 120V, 240V). In some embodiments, the harness connectors may help keep the two halves of the base 110 snapped together. In some embodiments, the device 100 comprises pressure clips releasable with a screwdriver.

A dimmer 130 is disposed on the front surface 110*c* of the base 110 (e.g., see FIG. 1). The dimmer 130 comprises a light system for illuminating the dimmer 130.

Figure 5:
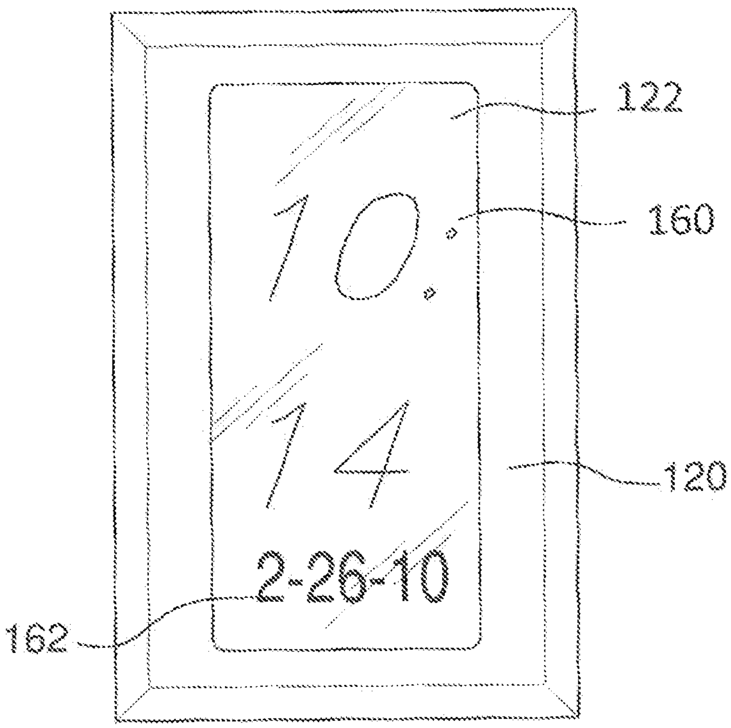
FIG. 5 is a front view of an alternative embodiment (e.g., "décor-style embodiment) of the backup lighting system of the present invention.

Removably attached to the front surface 110*c* of the base 110 is a base cover 120. The base cover 120 has a display 122 disposed in the center of the base cover 120. The display 122 generally covers the dimmer 130 when the base cover 120 is attached to the base 110. The dimmer 130 provides light to the display 122. The display 122 may resemble a touch screen display, for example. In some embodiments, a power icon 140 is disposed (e.g., etched) on the display 122. In some embodiments, dimmer icons 150 are disposed on the display 122. The dimmer icons 150 are each operatively connected to the light system of the dimmer 130 and function to brighten or dim the illumination of the display 122. FIG. 5 shows an alternative embodiment of the display 122 (e.g., a décor-style embodiment), wherein a clock icon 160 and date icon 162 are disposed on the display 122.

In some embodiments, the base cover 120 is larger in size (e.g., length, width) as compared to the base 110. In some embodiments, the base cover 120 functions as a mounting bracket for mounting the system 100 to a location such as a wall location.

Figure 3:
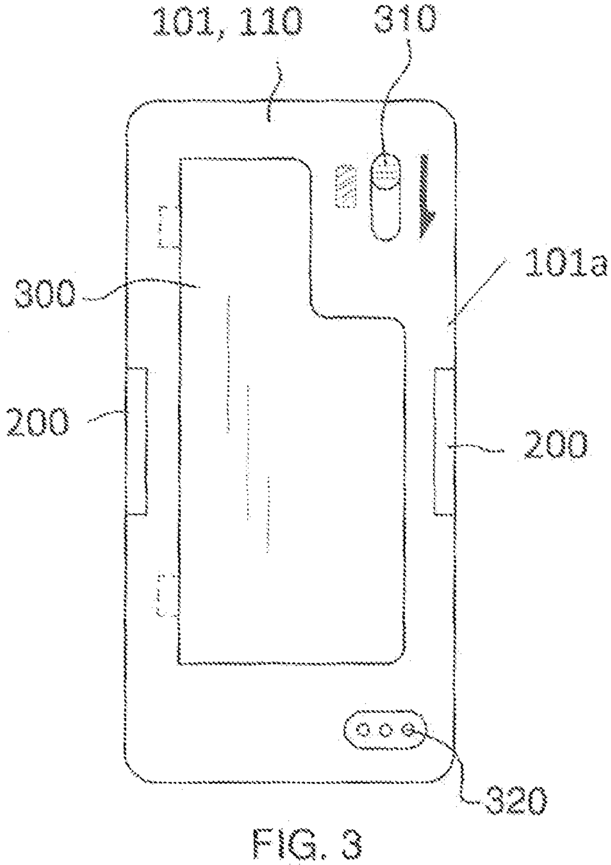
FIG. 3 is a back view of the front half of the base of the backup lighting system of the present invention.

As shown in FIG. 3, a battery (e.g., rechargeable) can be stored in the base 110, for example in the front half 101 of the base 110. In some embodiments, the battery is operatively connected to the wiring 118. A battery cover 300 is disposed on the inner surface 101*a* of the front half of the base 110 that can open and close respectively allowing and preventing access to the battery. In some embodiments, the battery cover 300 comprises a battery cover release button 310, which functions to open the battery cover 300. Such release buttons are well known to one of ordinary skill in the art.

In some embodiments, the device 100 comprises a water resistant seal. In some embodiments, the device 100 comprises a spacing ring (e.g., in the display 122, in the "glowing area"). In some embodiments, the device 100 comprises an exit setting on/off switch. In some embodiments, one or more universal serial bus (USB) ports are disposed in the base plate/display. In some embodiments, the device 100 comprises an indicator light (e.g., indicating whether the system 100 is activated) disposed on the base plate 120 or display 122.

Figure 2:
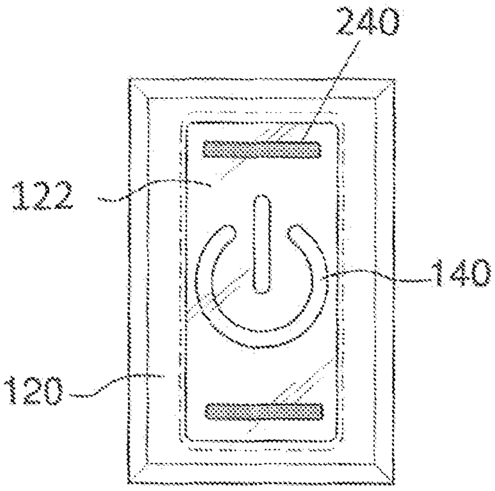
FIG. 2 is a front view of two versions of the backup lighting system of the present invention.

In some embodiments, one or more light emitting diodes 240 are disposed on the display 122 (e.g., see FIG. 2). In some embodiments, one or more photocells are disposed on the display 122.

The system 100 (e.g., display 122, base 110, etc.) may be constructed in a variety of shapes, sizes, and designs. For example, in some embodiments, the base 110 is about 1.25 inches in width as measured from the first side to the second side. In some embodiments, the base 110 is about 2 9/16 inches in length as measured from the top to the bottom. In some embodiments, the dimmer 130 is about 2 1/8 inches in length as measured from the top to the bottom. In some embodiments, the dimmer 130 is about 1/4 inch in width as measured from the first side to the second side. The present invention is not limited to the aforementioned dimensions. If the measurements are off, they can be replaced with the décor-style embodiment measurements so that if a user purchases the new switch he/she can use their existing décor-style plate with the switch.

The dimmer 130 may be programmable by the user. In some embodiments, the user can set the intensity of the dimmer 130 and/or the LED 240. In some embodiments, the user can set the color of the display 122 or dimmer 130 or LED 240. The device 100 may have "exit" settings. For example, the dimmer 130 and/or display 122 and/or LED 240 may glow red is power is lost. In some embodiments, a user can press the display a certain number of times to lock/unlock the system (e.g., when locked, the dimmer will disable and the LED will glow red). In some embodiments, pressing the display 122 a certain number of times (e.g., three times) can set the LED color and/or intensity.

In an alternative embodiment (not shown), the system may comprise an audible confirmation system (e.g., piezo). The system may comprise a glowing area dimmer (e.g., 1 inch to 2.25 inches long). The system may comprise a status LED (e.g., off is normal operation, green is running on batteries, amber is charging, and red is switch locked). In some embodiments, the system has a push on/off confirmation. Five presses of the base plate 120 or display 122 locks the switch, and five presses to unlock. The glowing area may be used to read dimmer settings. The glowing area may be used as a timer. In the on position the glowing piece is off, in the off position the glowing piece is on (intensity may be set by the user). A top section of the glowing piece may serve as a dimmer to increase light, and a bottom section of the glowing piece may serve as a dimmer to dim the light. The glowing area can be user selectable (e.g., blue, violet, red, pink, green). There may be an optional photocell—if on the lights are on—the intensity is selectable. There may be an optional timer with multiple (e.g., 4) settings, for example from about 15 minutes to 60 minutes. The glowing piece may illuminate one through four sections. There may be an embedded back up battery. There may be an option if the switch is set to exit in the event of main power failure, glowing piece would engage backup batteries and glow red to represent an exit.

The disclosures of the following U.S. Patents are incorporated in their entirety by reference herein: U.S. Pat. Application No. 2008/0233780; U.S. Pat. Application No. 2006/0267788; U.S. Pat. No. 4,617,613; U.S. Pat. No. 7,036,948;

U.S. Pat. No. 6,547,411; U.S. Pat. No. 5,813,873; U.S. Pat. No. 5,288,945; U.S. Pat. No. 6,666,712; U.S. Pat. No. 3,971,028; U.S. Design Pat. No. D464,865.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

In relation to component 110, the battery compartment would house the APU (Auxiliary Power Unit) (rechargeable batteries and embedded charger). During normal operation, the device would illuminate and function under the standard 120v supplied by the structure (residential or business). The built in APU would continually monitor and charge the batteries to ensure optimal charge in the event of power disruption. The APU could be constructed in accordance with the present invention as would be known by one of ordinary skill.

What is claimed is:

1. A backup lighting system comprising:

(a) a base 110 divided into a front half 101 and a back half 102, the front half 101 and back half 102 can be separated;

(b) a dimmer 130 disposed on a front surface 101*c* of the base 110, the dimmer 130 comprises a light system for illuminating the dimmer 130;

(c) a first bracket 134*a* and a second bracket 134*b* both disposed on the base 110, the brackets 134 allow the base 110 to be mounted in a socket;

(d) wiring 118 disposed on the base 110, the wiring 118 is adapted to engage electrical circuitry;

(e) a base cover 120 removably attached to the front surface 101*c* of the base 110, a display 122 is disposed in a center of the base cover 120, wherein when the base cover 120 is attached to the base 110 the display 122 covers the dimmer 130, the dimmer 130 is operatively connected to the display 122, and the dimmer 130 provides light to the display 122, wherein dimmer icons 150 are disposed on the display 122 and function to brighten or dim the dimmer 130; and (f) a battery disposed in the front half 101 of the base 110, the battery is operatively connected to the dimmer 130, the wiring 118, and the display 122, wherein the dimmer 130 provides light via the battery whether or not power is provided via the wiring 118.

2. The backup lighting system of claim 1, wherein the first bracket 134*a* is disposed on a top 110*e* of the base near the front surface 110*c*.

3. The backup lighting system of claim 1, wherein the second bracket 134*b* is disposed on a bottom of the base near the front surface 110*c*.

4. The backup lighting system of claim 1, wherein the display 122 is a touch screen display.

5. The backup lighting system of claim 1, wherein the display 122 comprises a power icon 140.

6. The backup lighting system of claim 1, wherein the display 122 comprises a clock icon 160.

7. The backup lighting system of claim 1, wherein the display 122 comprises a date icon 162.

8. The backup lighting system of claim 1, wherein the display 122 comprises a light emitting diode 240.

9. The backup lighting system of claim 1 further comprising a locking mechanism 200 for securing the front half 101 of the base 110 to the back half 102 of the base 110.

10. The backup lighting system of claim 9, wherein the locking mechanism 200 features a release button 201 which can be pressed to detach the front half 101 of the base 110 from the back half 102 of the base 110.

11. The backup lighting system of claim 1 further comprising a battery cover 300 disposed on an inner surface 101*a* of the front half of the base 110 that can open and close respectively allowing and preventing access to the battery.

12. The backup lighting system of claim 11, wherein the battery cover 300 comprises a battery cover release button 310 that functions to open the battery cover 300.

* * * * *